United States Patent [19]
Bergling

[11] Patent Number: 5,433,536
[45] Date of Patent: Jul. 18, 1995

[54] THRUST BEARINGS

[75] Inventor: Gunnar Bergling, Partille, Sweden

[73] Assignee: Aktiebolaget SKF, Gothenburg, Sweden

[21] Appl. No.: 250,438

[22] Filed: May 27, 1994

[30] Foreign Application Priority Data

Jun. 18, 1993 [AU] Australia .............................. PL9491

[51] Int. Cl.⁶ .......................... F16C 33/58; F16C 23/06
[52] U.S. Cl. .................................... 384/620; 384/563; 384/619
[58] Field of Search ............... 384/495, 517, 518, 558, 384/563, 568, 590, 612, 613, 618, 619, 620

[56] References Cited

U.S. PATENT DOCUMENTS

| | | | |
|---|---|---|---|
| 3,003,836 | 10/1961 | Hill | 384/620 X |
| 4,363,608 | 12/1982 | Mulders | 384/619 X |
| 4,923,313 | 5/1990 | Bergling | 384/620 X |
| 4,973,173 | 11/1990 | Bergling | 384/620 X |
| 5,261,750 | 11/1993 | Eckhardt et al. | 384/620 X |

Primary Examiner—Thomas R. Hannon
Attorney, Agent, or Firm—Burns, Doane, Swecker & Mathis

[57] ABSTRACT

A thrust bearing assembly includes a bearing housing and a shaft supported therein in a front and rear spherical thrust roller bearings. First and second spring devices are provided to pre-load the front and rear bearings. The bearing pre-load exerted by the first spring device acts on the front bearing in a direction opposed to a working load applied to the front bearing. The first spring device removes the spring force from the front bearing race rings, when exposed to a working load exceeding the load exerted by the first spring device. The first and second spring devices under working load and idle conditions being arranged to provide clearance between the rear bearing outer race and a bearing housing seat for the rear bearing outer race for allowing tilting of the outer race in order to compensate for radial oscillations, thereby avoiding rubbing movement between the outer race ring and the housing.

9 Claims, 9 Drawing Sheets

THRUST BEARINGS

BACKGROUND OF THE INVENTION

This invention relates to anti-friction bearings more specifically this invention relates to spherical or self-aligning roller thrust bearings. The invention will be described with reference to a bearing assembly having two axially spaced roller thrust bearings so as to render the bearing assembly capable of absorbing load in both axial directions, but it is to be understood that the invention is capable of broader application.

Spherical roller thrust bearings generally comprise an outer and an inner annular race between which are situated a plurality of rolling elements. The rolling elements facilitate substantial friction-free rotation of a shaft relative to a housing by allowing the races to roll over the rolling elements. Thus the rolling elements are capable of rolling movement but not translational movement, being retained in a substantially fixed position between the inner and outer races by means of a cage. The outer race has an outer axial abutment surface for abutting engagement with a complementary abutment formation on a shaft.

In bearing assemblies which include a pair of axially spaced roller thrust bearings to accommodate axial thrust in both directions along a shaft, one of the bearings can be given the possibility to oscillate in a radial direction to accommodate run-out or eccentricities in the shaft.

With known bearing assembly configurations, the outer race accommodates these eccentricities by the outer axial abutment performing a radial rubbing or sliding action against the complementary abutment formation on the housing. This accelerates frictional wear of the outer race and housing and besides wear particles reduce the life of the bearing.

Known bearing assembly configurations are capable of accommodating some misalignment by the pivoting of the outer race relative to the inner race. This capability is, however, confined to certain load conditions.

SUMMARY OF THE INVENTION

It is an object of this invention to provide a bearing assembly which overcomes at least most of these shortcomings.

This invention is characterized by the provision of a bearing assembly including a bearing which is adapted to facilitate the outer race thereof pivoting relative to a housing against which it abuts, thereby to accommodate run-out and eccentricities in a shaft to which the bearing is mounted.

Thus rubbing or sliding of an outer axial abutment of the outer race against its complementary abutment is avoided and no wear of the contacting surfaces will occur.

Further the assembly may include biasing means urging the axial outer abutment into engagement with the complementary abutment on the housing so as to resist the tendency of the axial outer abutment to slide over the complementary abutment. In a preferred form the biassing means may comprise a plurality of springs.

The part of the housing surrounding the outer race abuts against a pivot protrusion on the housing, such as a buttress.

The bearing assembly must have a suitable axial clearance, for example 0.15 mm to 0.20 mm, to facilitate pivoting of the outer race relative to the housing. Further variations in the axial position of the outer race may be accommodated by springs providing the spring loading for the bearing, and located between the outer race and the housing.

In one particularly preferred form of the invention, the assembly includes two bearings which are axially spaced from each other. As described above, one of the bearings has an outer race adapted to pivot relative to the housing while the further bearing is arranged such that the outer race thereof is unable to pivot relative to the housing.

Thus the further bearing radially locates a shaft within the housing and does not oscillate radially. The first bearing which does oscillate radially, accommodates this oscillation by means of a pivoting of the outer race.

The outer race of the further bearing may be constrained against pivoting relative to the housing by means of a sleeve which surrounds the outer race circumferentially.

By means of the invention, it is possible to avoid wear by race pivoting. Another advantage is that the spring loading of the two bearings is made in such a manner that they form an internal force flow, which will provide both bearings with required pre-load under all magnitudes and directions of the external working load. As distinguished from other applications, the invention permits that the working load changes direction, even at very high operating rotational speeds, without the risk of smearing because of the absence of bearing clearance. This advantage is brought about without reduction of the life of the further bearing by its spring load.

Optionally the bearing assembly further may include hydraulic pre-loading.

BRIEF DESCRIPTION OF THE DRAWINGS

A thrust bearing according to the invention may take any one of a variety of forms. It will be convenient hereinafter to describe the invention in greater detail by reference to one particular form as shown in the accompanying drawings. The particularity of these drawings is not to be understood as superseding the generality of the preceding description. In the drawings.

DETAILED DESCRIPTION OF PREFERRED EMBODIMENTS OF THE INVENTION

Figure 1:
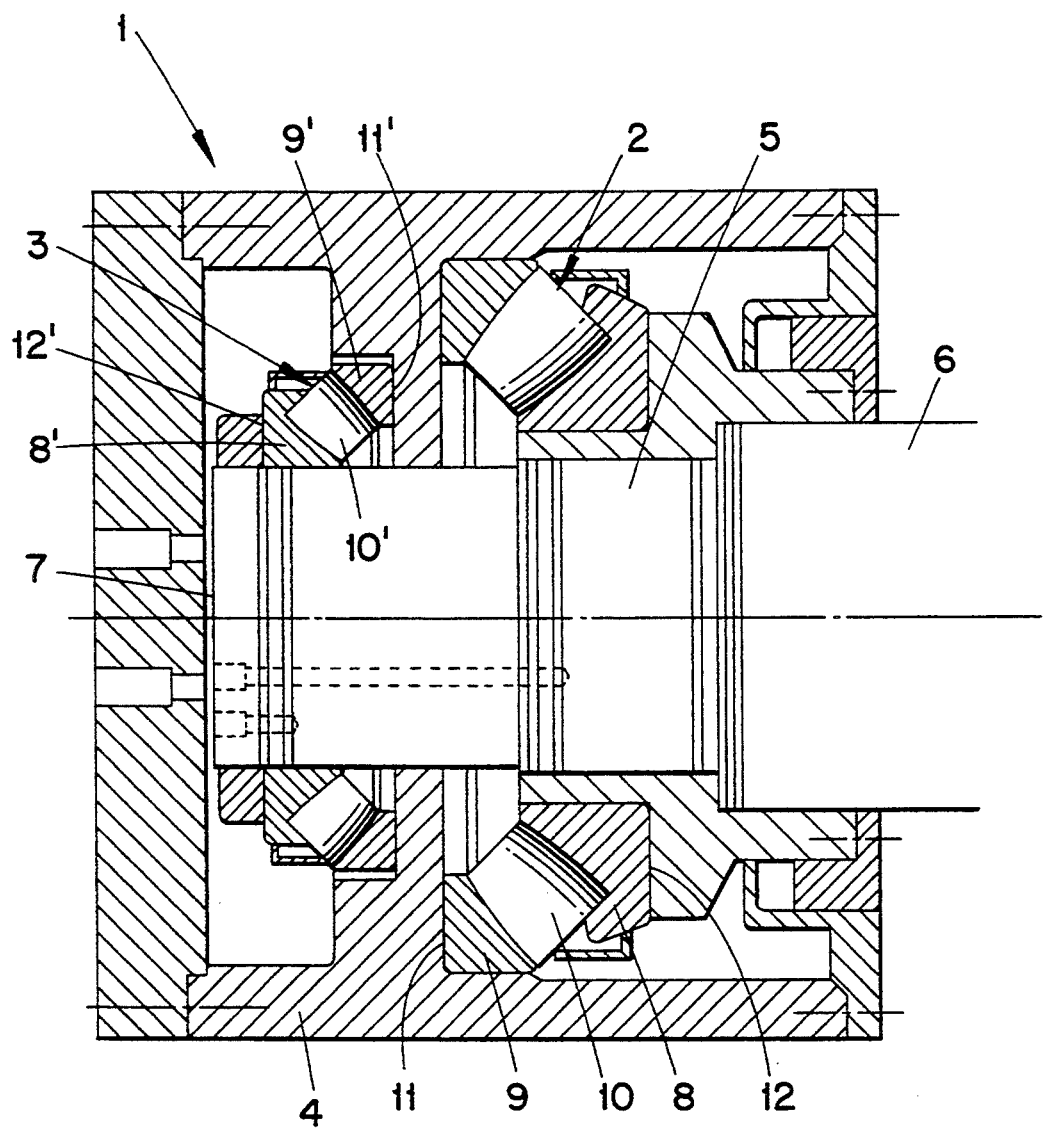
FIG. 1 is a sectional front elevation of a known bearing assembly.

FIG. 1 illustrates a prior art bearing assembly indicated generally by reference numeral 1. Basically, the assembly 1 comprises a shaft 5 rotatably mounted in a housing on a first or front bearing 2 and an axially spaced second or rear bearing 3. The feature of having two bearings enables the assembly 1 to absorb loading from either end of the shaft 5. For example, if thrust is applied to the shaft 5 from the end 6, the front bearing 2 will direct the force into the housing 4 and retain the shaft 5 in the appropriate position relative to the housing 4. Similarly, if thrust is applied to the end 7 of the shaft 5, the rear bearing 3 will direct the force into the housing 4, and retain the shaft 5 in an appropriate axial position relative to the housing 4.

Each bearing 2 and 3 has an inner race 8, 8' an outer race 9, 9' and a plurality of rolling elements 10, 10' disposed between the races 8, 9 and 8', 9'. The outer race of each bearing has an axially outer abutment 11, 11' abutting against a complementary abutment on the housing 4, and each inner race has an axial inner abutment 12, 12' abutting against a complementary abutment in the shaft 5.

Spherical roller-thrust bearings are adapted to receive radial loads as well as axial loads. In order to maintain a force equilibrium in the bearing in the case where there is a radial load on the bearing but no axial load, a spring load acting in an axial direction is required.

In FIG. 1, the spring load (not shown) acts from the end 6 of the shaft 5 towards the bearing 2, that is it acts in the same direction as the axial load on the bearing 2. This arrangement exposes the bearing 2 to high stress because the spring load is always added to the working load and has the effect of substantially reducing the bearing life.

The assembly 1 works well provided that the axial working load all the time acts in one direction only, i.e., from the end of the shaft 5 towards the bearing 2. If the load acts in the opposite direction, there is a risk of smearing of the bearing 2, at high speeds, because of bearing clearance.

Figure 2:
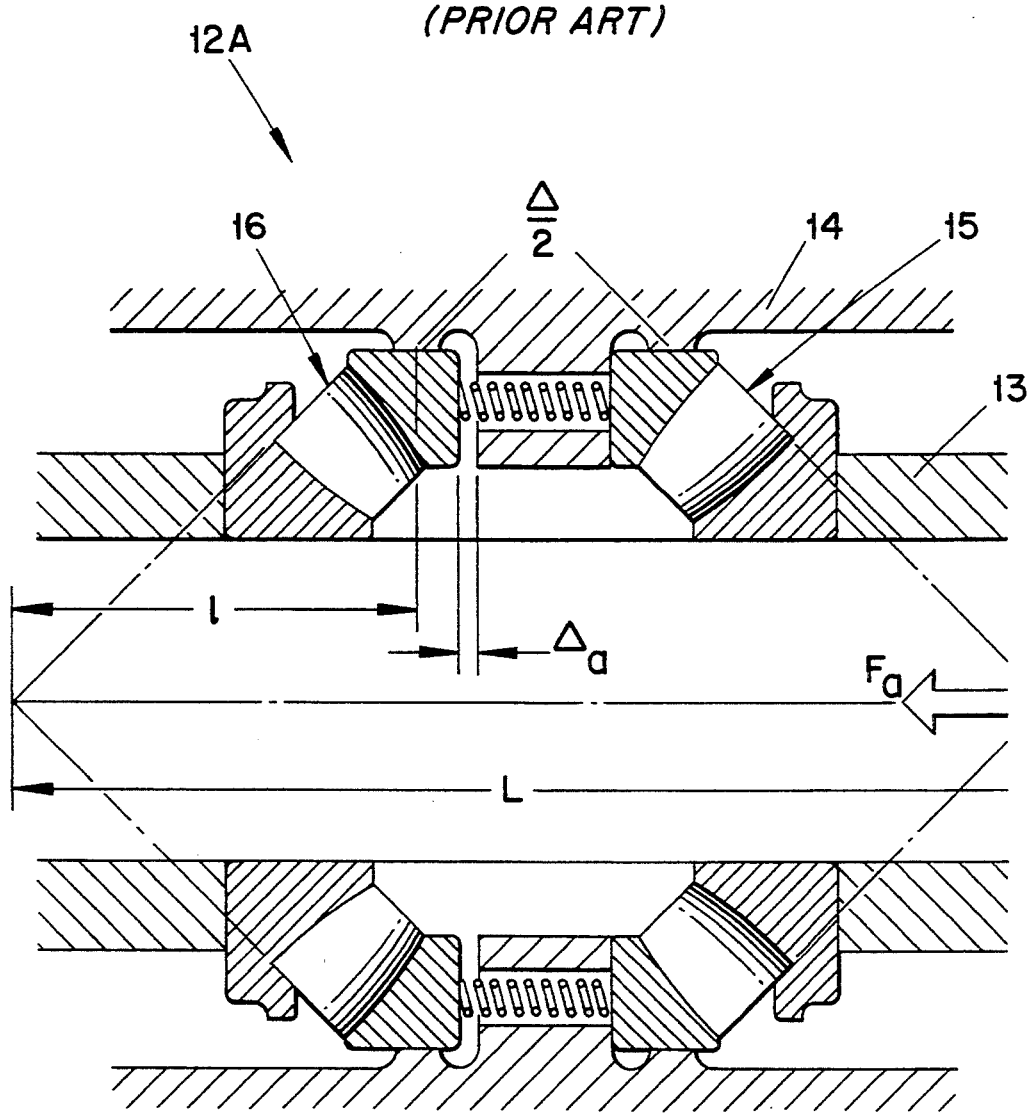
FIG. 2 is a sectional front elevation of a further known bearing assembly.

FIG. 2 shows a further prior art bearing assembly indicated generally by reference numeral 12A. The assembly 12A comprises basically a shaft 13 rotatably mounted to a housing 14 in a front bearing 15 and an axially spaced rear bearing 16. The disadvantage of this bearing assembly 12 is that the large axial spring load reduces the life of bearings 15 and 16 considerably. The design permits external axial loads in both directions.

Figure 3:
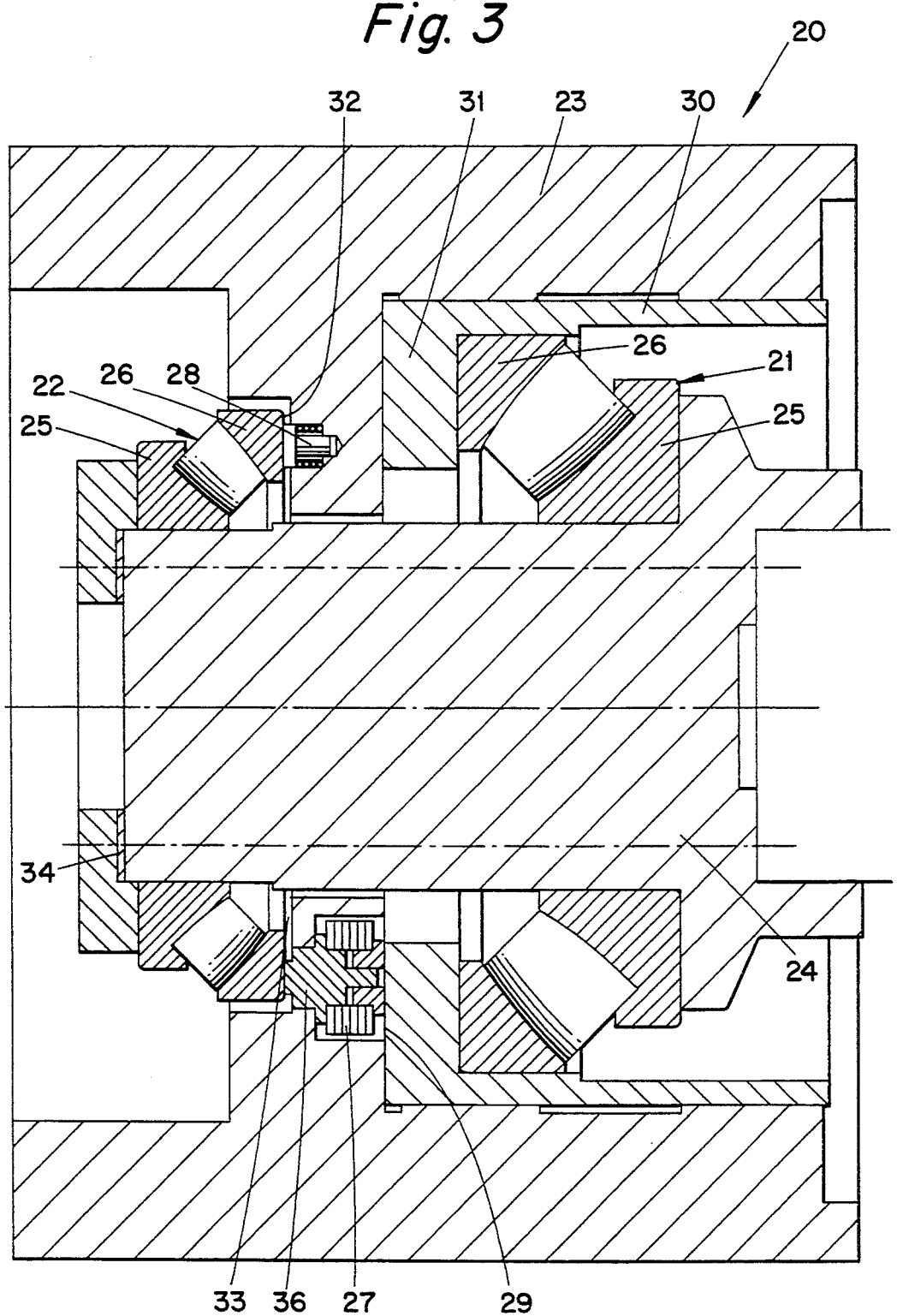
FIG. 3 is a sectional front elevation of a bearing assembly in accordance with the present invention.

Having provided a short description of known bearing assemblies 1 and 12A and outlined some of their shortcomings, we now turn to FIG. 3 which illustrates a bearing assembly in accordance with the principles of the invention.

In FIG. 3, the bearing assembly is designated generally by the reference numeral 20. The front and rear bearings are designated respectively by the numerals 21 and 22, the housing and shaft by numerals 23 and 24 and the inner and outer races by numerals 25, 26 and 25', 26'.

The spring loading on the front bearing 21, and also on the rear bearing 22, is provided by a plurality of springs 27. The springs 27 are located intermediate the housing abutment and the axial outer abutment 29 of the bearing 21, and thus act in a direction opposite to the direction of axial loading on the bearing 21. Consequently when, during operation, the axial working load is sufficiently large to dominate the springs 27, i.e., to bottom-out the springs, the axial outer abutment 29 will bear directly against the housing. Thus the spring loading has no effect on the bearing 21 when such a working load is applied to the shaft and this leads to longer bearing life.

During steady state running, the rear bearing 22 will be subjected to axial load from the springs 27. During operation this bearing will, however, be completely unloaded from these springs, and there will be clearance between the outer race 26' and the spring components 36, caused by bearing and spring deflections, when the working load is applied.

Required spring loading during working operation for the rear bearing 22 is provided by springs 28 which are also arranged to act in the opposite direction to the direction of axial loading of the bearing 22.

By having separate springs 27 and 28 for the loading of bearings 21 and 22, respectively, it is possible to select springs appropriate for the particular bearing in question. In this manner a spring can be selected which is only just strong enough to pre-load the particular bearing under consideration, thereby keeping the load on the bearing as low as possible. As the rear bearing does not have to take up radial loads and is smaller, the required pre-load may be less than a tenth of the load required for the front bearing.

A further feature of the bearing illustrated in FIG. 3, is that the outer race 26 of the front bearing 21 is retained within an annular sleeve 30 having a radially inwardly projecting flange 31 at one end thereof. The axial outer surface of the flange 31 then forms the axial outer abutment 29 of the bearing 21 abutting against the housing 23. The function of the sleeve 30 is to prevent tilting of the outer race 26 of the bearing 21. It is also to be appreciated that some clearance as indicated by reference numeral 33 in FIG. 3 should be provided between the axial outer abutment 32 of the bearing 22 and the complementary housing abutment, to permit the race 26 to pivot sufficiently. A suitable clearance can be obtained by appropriate selection of spacers 34. This clearance has no influence on the clearance within the bearings 21 and 22. Generally, there will be no clearance within the bearings themselves.

A specific example of a bearing assembly 20 in accordance with the embodiment described in FIG. 3 will now be discussed. The bearing 21 is an SKF 29440 E bearing and the bearing 22 is an SKF 29338 E bearing. Both of these bearings are manufactured and sold by SKF, Göteborg, Sweden.

The spring 27 comprises nine discrete springs arranged spaced apart in a circular configuration on the end of bearing 21 urging against the axial outer abutment 29. Each of the nine springs comprises six disc springs arranged in series and the springs 27 collectively provide a total spring loading of 86 kN on bearing 21 (and during steady state running a total spring loading of 86 kN, minus the total spring loading from the springs 28, on rear bearing, if frictional forces are disregarded).

Similarly the spring 28 comprises nine discrete springs arranged spaced apart in a circular configuration at the end of the bearing 22. The springs 28 collectively provide a total spring loading of 6 kN on the bearing 22.

With the bearing assembly 20 described above, despite the fact that there is a large axial working load, a satisfactory basic rating life L10h of 20,000 h is obtained for the most heavily loaded bearing, that is bearing 21.

The basic rating life is calculated from the ISO equation which is $$L_{10} = \left(\frac{C}{P}\right)^P$$

where:

$L_{10}$ = basic rating life in millions of revolutions
C = basic dynamic load rating N
P = equivalent dynamic bearing load
P = exponent of the life equation which is 10/3 for roller bearings.

In use, the springs 27 ensure that the front bearing 21 under all operating conditions works free of clearance and also with the required pre-load. The spring 28 presses component 36 of the spring 27 into contact with its axial supporting surface in the housing 23. Further the spring 28 provides the bearing 22 with an appropriate axial pre-load, during working operation. During steady state running all springs 27 and 28 provide the rear bearing 22 with axial pre-load.

When putting the assembly 20 together, distance washers 34 are mounted on the shaft 24 to obtain an appropriate level of axial clearance 33 between the axial outer abutment 32 and the proximate region of the housing 23. Sufficient axial clearance 33 is required to permit free tilting of the race 26 of bearing 22. Typically a clearance of about 0.15 mm to 0.20 mm would be appropriate. If thermal expansion of the bearing due to heating on start-up is encountered, the clearance 33 is reduced slightly. However, a clearance of 0.15 mm has been found to be enough to cope with all tilting movements. A further unrelated advantage conferred by the FIG. 3 bearing assembly is that thermal expansion of the bearing to a large extent is accommodated by the springs 27 and 28 so that the extra loading is not applied directly on the bearings 21 and 22. In operation the axial clearance 33 does not have any effect on the performance of the bearings 21 and 22 due to the spring loading. Generally, the bearings 21 and 22 work free of clearance under all operating conditions. During operation of the assembly 20, restriction of the clearance 33 occasionally does occur if the working load changes direction. This occurs, e.g., for a refiner if a negative pressure arises between the refiner discs.

Figure 4:
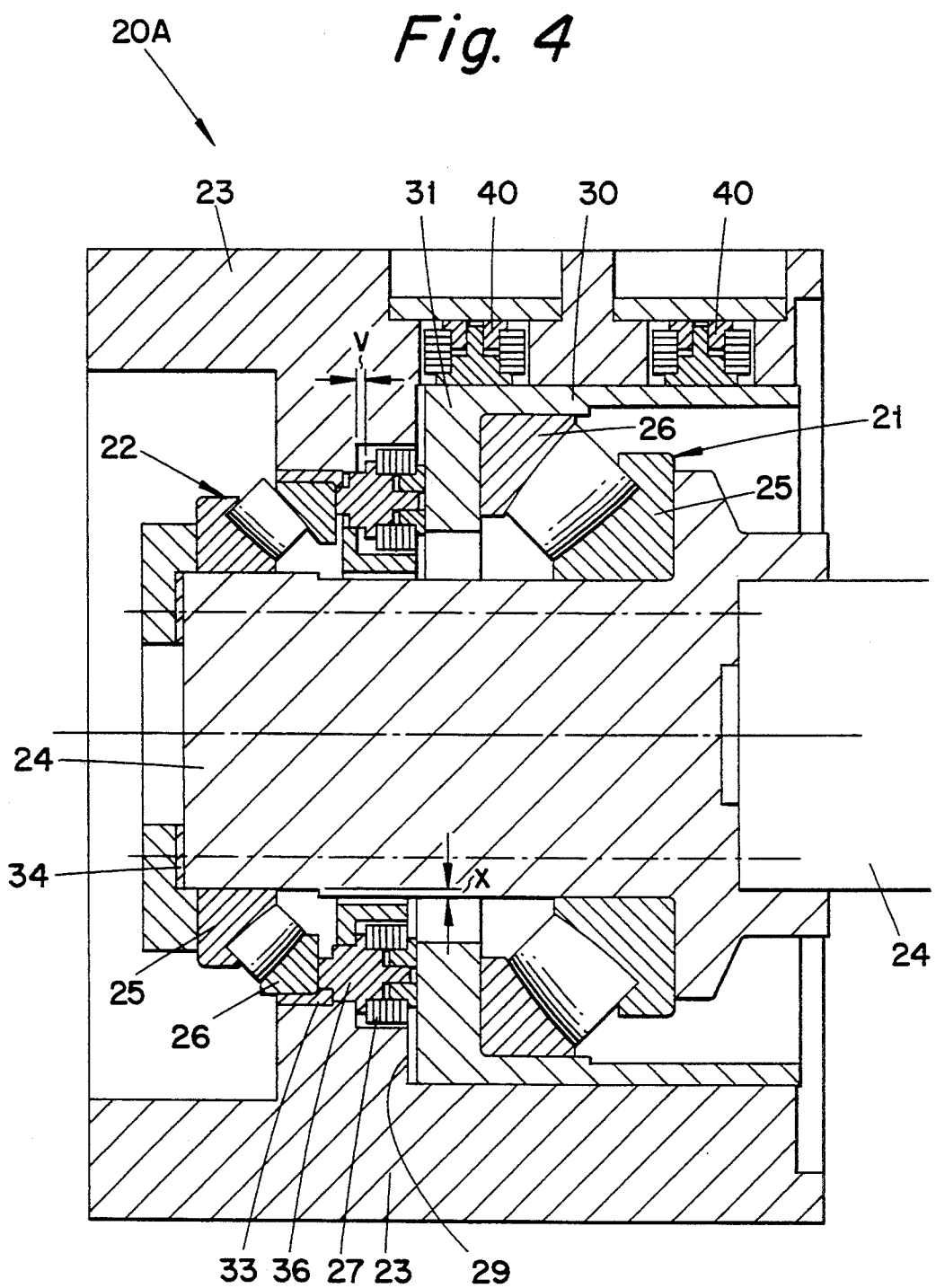
FIG. 4 is a sectional front elevation of a further variation of the assembly of FIG. 3 showing additional detail.
Figure 5:
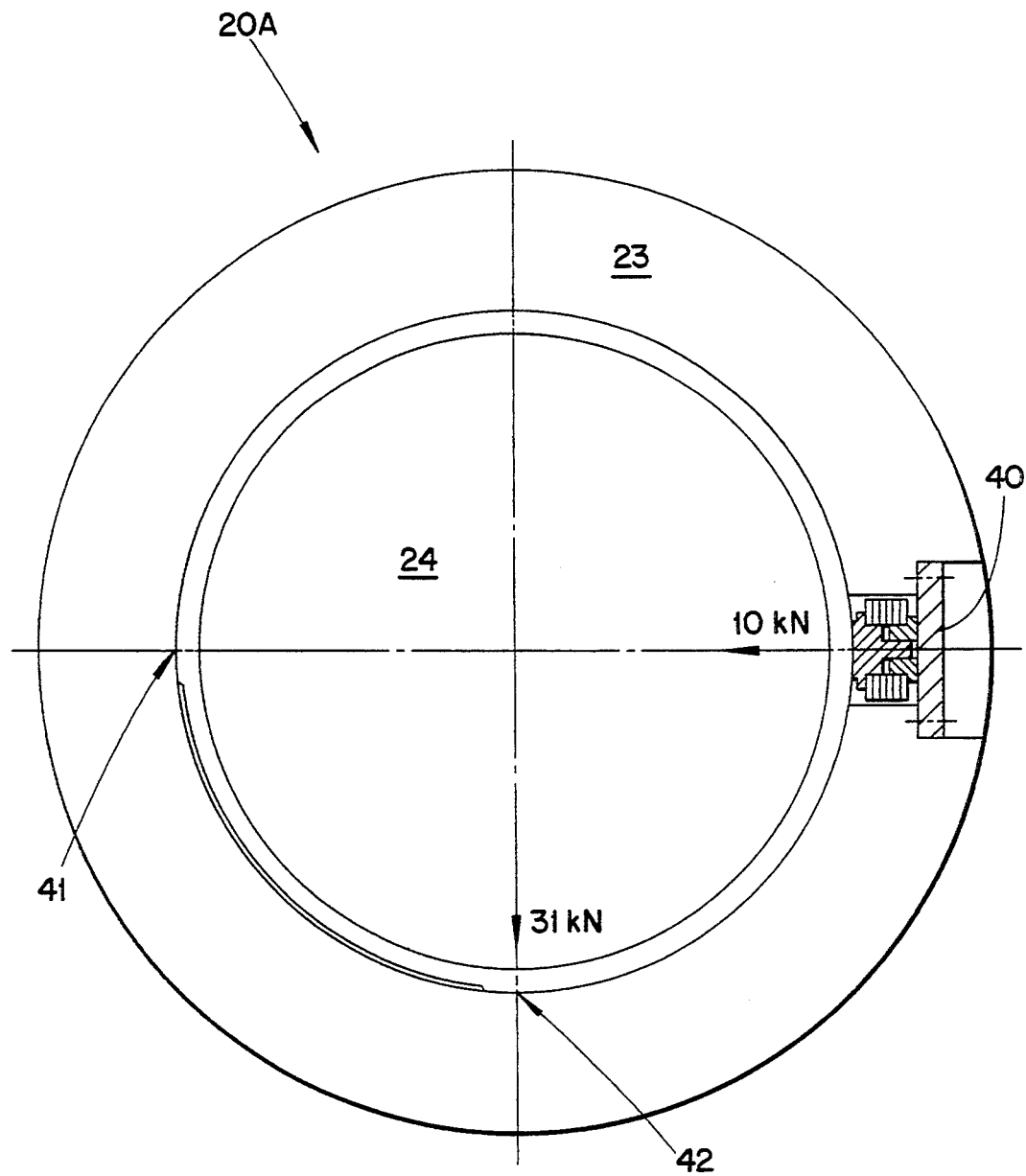
FIG. 5 is a sectional end elevation of the assembly of FIG. 4.

As described above, the sleeve 30 is intended to prevent the front bearing 21 from tilting relative to the housing 23. However, to ensure that it accomplishes this object effectively it is necessary to ensure that the influence of the radial clearance between the sleeve 30 and the housing 23 is eliminated. As shown in FIGS. 4 and 5, in which the same reference numerals refer to the same components, this can be achieved by means of a modified assembly 20A which includes one or more springs 40, which press the sleeve 30 against the opposed wall contact area 41 of the housing 23. In a preferred form, the press action is performed by two springs arranged in parallel and each exerting a force of 5 kN. The springs 40 press against the sleeve 30 in the horizontal plane. In the vertical plane, the weight of the shaft 24 and associated components urges the sleeve 30 into abutting engagement at contact area 42 of the housing 23 with a cumulative force of 31 kN. Sleeve 30 thus is aligned by the contact areas 41, 42 and no external radial loads irrespective of direction are heavy enough to unload any one of the contact areas 41 and 42.

In the bearing assembly 20A described above, the springs 27 preload the two bearings with a load of 86 kN. This causes an axial displacement of 0.064 mm as shown in FIG. 6 and the bearing 21 and sleeve 30 will be moved 0.064 mm to the right.

Figure 7:
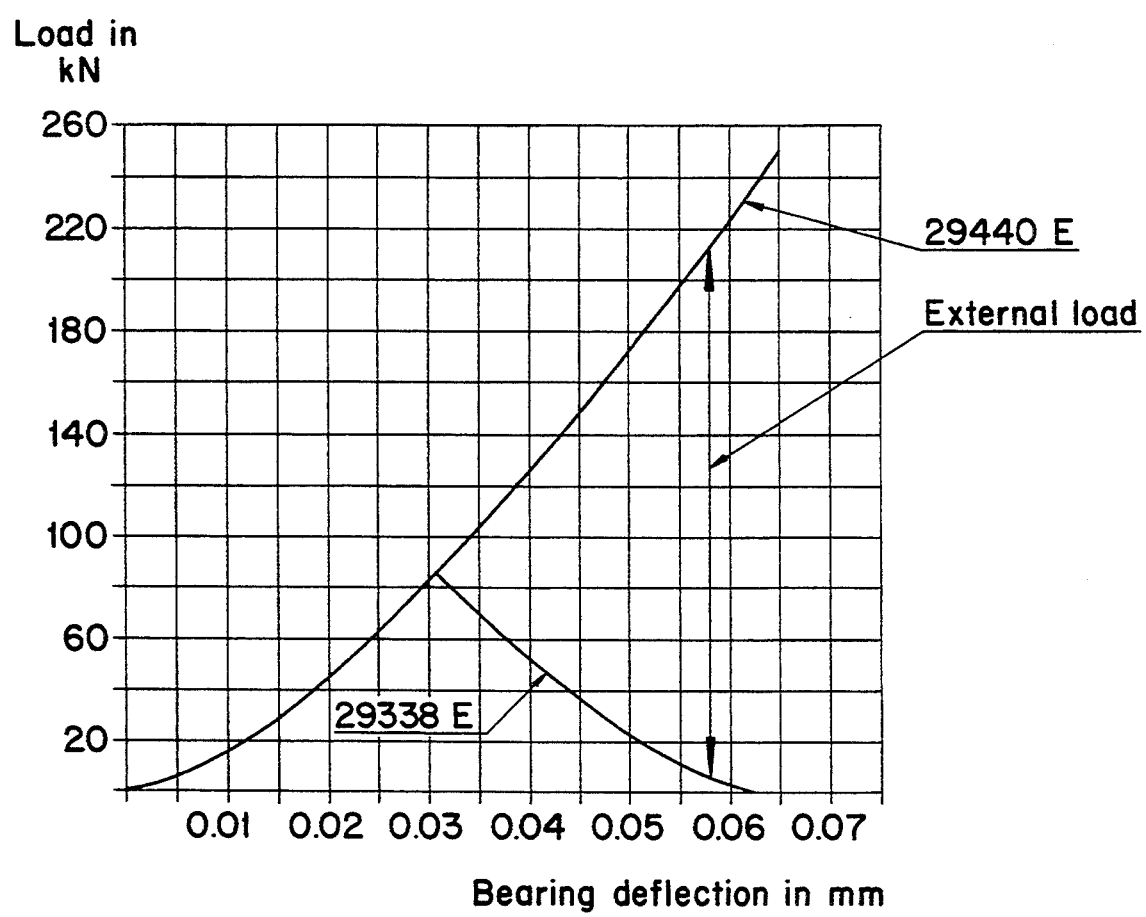
FIG. 7 is a graph indicating bearing deflection as a function of bearing load for the two bearings used in a preferred embodiment of the invention.

When an axial load of 250 kN is applied to the shaft 24, the deflection of the bearing 21 will be 0.033 mm according to the bearing characteristics graph shown in FIG. 7. Accordingly, the total axial displacement when the working load is applied will be 0.097 mm.

Figure 6:
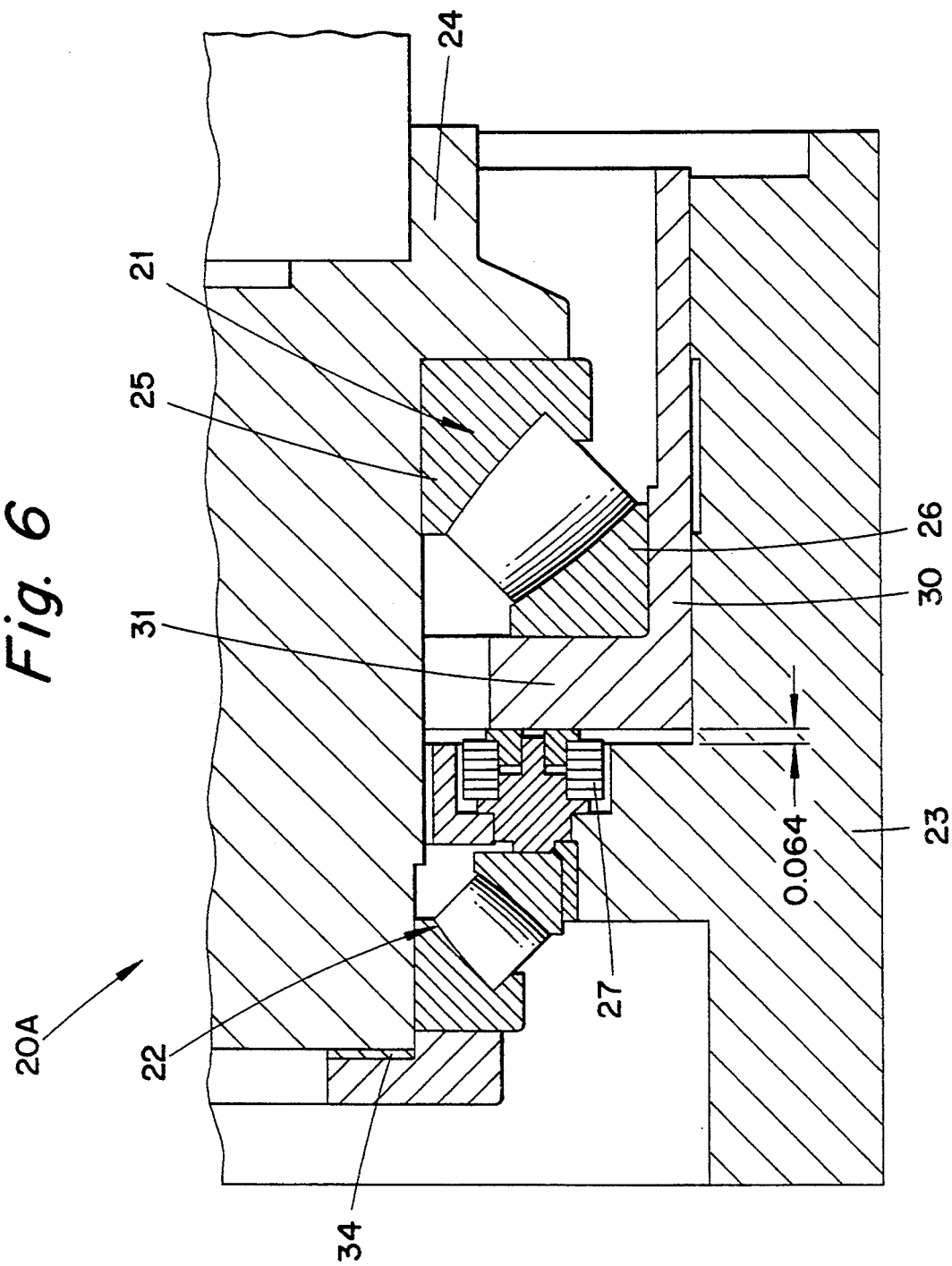
FIG. 6 is a sectional front elevation of the assembly of FIG. 3.

It is to be appreciated that the distance of 0.064 mm shown in FIG. 6 could for example be reduced to 0.032 mm by reduction of the thickness of the spacers by 0.032 mm. The axial displacement of the shaft 24 when a 250 kN load is applied will then be 0.065 mm, and for a 180 kN load 0.054 mm. With such an arrangement, the permitted radial run-out will be reduced to 0.13 mm–0.15 mm. However, with narrow manufacturing tolerances the reduced run-out value should be acceptable and a bearing assembly is provided with optimum operating properties.

In FIG. 4, it can be observed how an eccentricity x leads to a tilting distance v.

Without being bound by theory, it is believed that the following mathematical relationship relates the tilting distance v to the eccentricity x during idle running periods, when the race 26 pivots on the springs 27 and 28:

$$v = 1.7x$$

Therefore, if an axial clearance of 0.15 mm is provided, a radial run-out of 2x=0.18 mm can be accommodated.

The tilting of the race 26 of the rear bearing 22 will not cause any displacement of the sleeve 30 as the frictional resistance from the radial surfaces of the sleeve 30 and the spring load from the springs 28 are sufficiently high. The frictional resistance is believed to be about 6 kN and the spring load from the tilting is believed to be about 1.4 kN.

Again without being bound by theory, it is believed that during working conditions when the shaft is subjected to axial loading, the following mathematical relationship relates the tilting distance v to the eccentricity x, when the race 26 pivots on the springs 28:

$$v = 0.84x$$

Therefore with an axial clearance between the race 26 and the spring components 36 of 0.086 mm to 0.097 mm, the permissible radial run-out 2x will be 0.20 to 0.23 mm. The axial clearance is a result of spring and bearing deflection caused by the working load.

Figure 8:
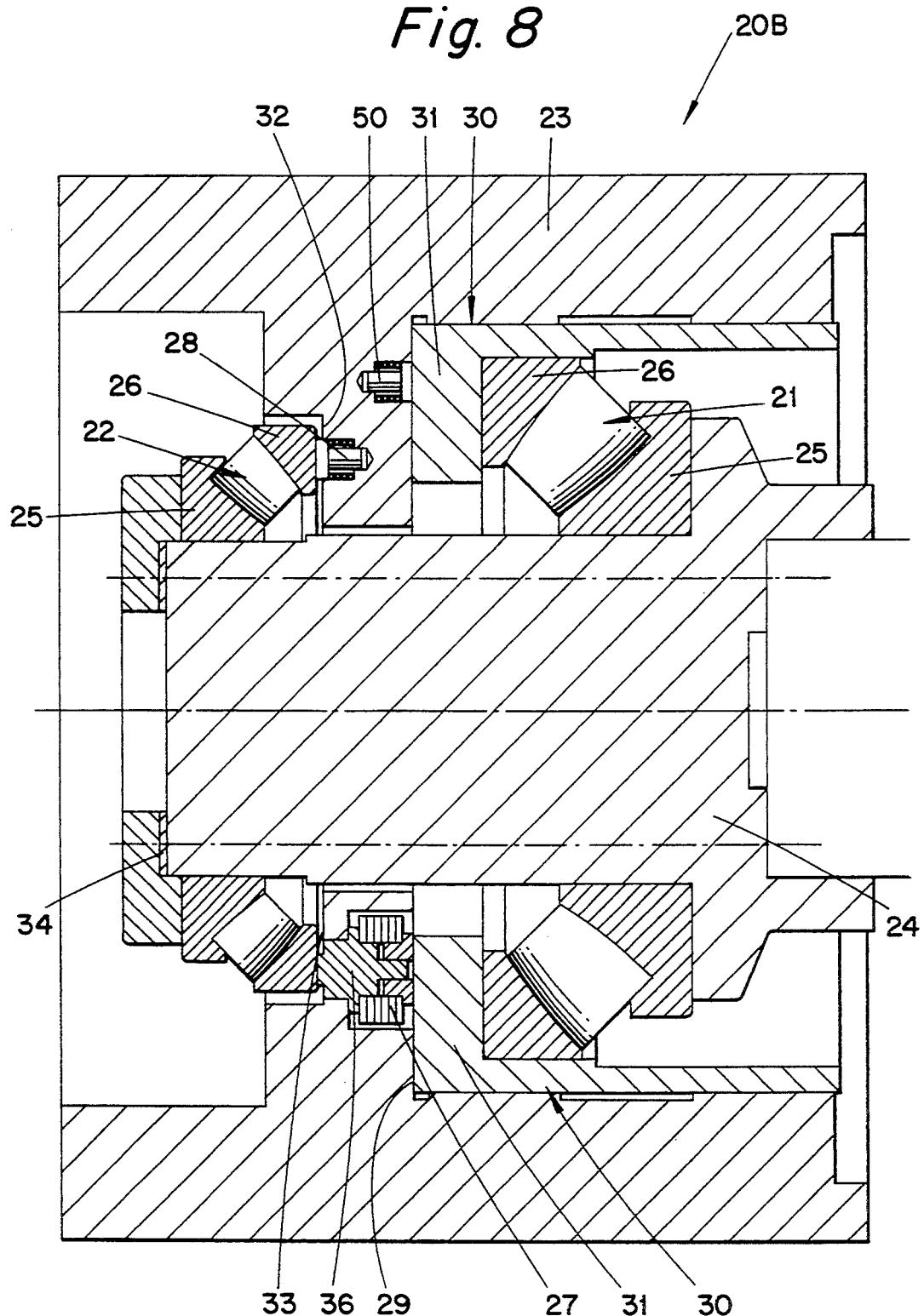
FIG. 8 is a sectional front elevation of a further variation of the bearing assembly shown in FIG. 3.

FIG. 8 illustrates a variation on the bearing assembly shown in FIG. 3. Unless otherwise specified the same reference numerals refer to the same components as those shown in FIG. 3. The major feature distinguishing the bearing assembly 20B in FIG. 8 from the bearing in FIG. 3 is the existence of the springs 50. These are nine springs 50 arranged at spaced intervals in a circle on the end of the sleeve 31. In an example embodiment with the basic components being the same as those discussed above with respect of FIG. 3, the springs 50 collectively impose a loading of 10 kN on the sleeve 31. Typically the springs 50 are designed in exactly the same way as the springs 28, but are compressed 0.4 mm less than the springs 28.

The springs 28 impose an external load of 11.7 kN on the rear bearing 22 and as discussed above, the springs 50 impose a load of 10 kN on sleeve 31. As a result the external load that presses the springs 28 and 50 into contact with their complementary abutments in the housing 23 is maximized at 1.7 kN, that is the total difference between the loading of springs 28 and 50. The difference is always found to be 1.7 kN irrespective of the size of the frictional resistance between the sleeve 31 and the housing 23.

It is important to limit this load to 1.7 kN as it tends to counteract the pivoting movement resistance of the outer race 26 on the springs 27 and thus must be kept sufficiently low so as not to inhibit tilting. On the other hand a load of a certain magnitude is required to keep the sleeve 31 hard up against the housing 23 via the springs 27, and their components 36.

Rubbing movements of the axial outer abutment 32 of the outer race 26 against the complementary abutment of the housing 23 will not occur in the assemblies 20 described in FIGS. 3 and 8 provided that an external axial load outside the range of 6 to 86 kN is applied to the shaft 24. Typically loads falling within this range are only applied during start-up periods and therefore do not pose the threat of excessive wear due to rubbing.

If, however, there is a likelihood of external loads falling within the range defined above occurring during long service periods, it may be advisable to eliminate the susceptibility to rubbing by hydraulic pre-loading.

Figure 9:
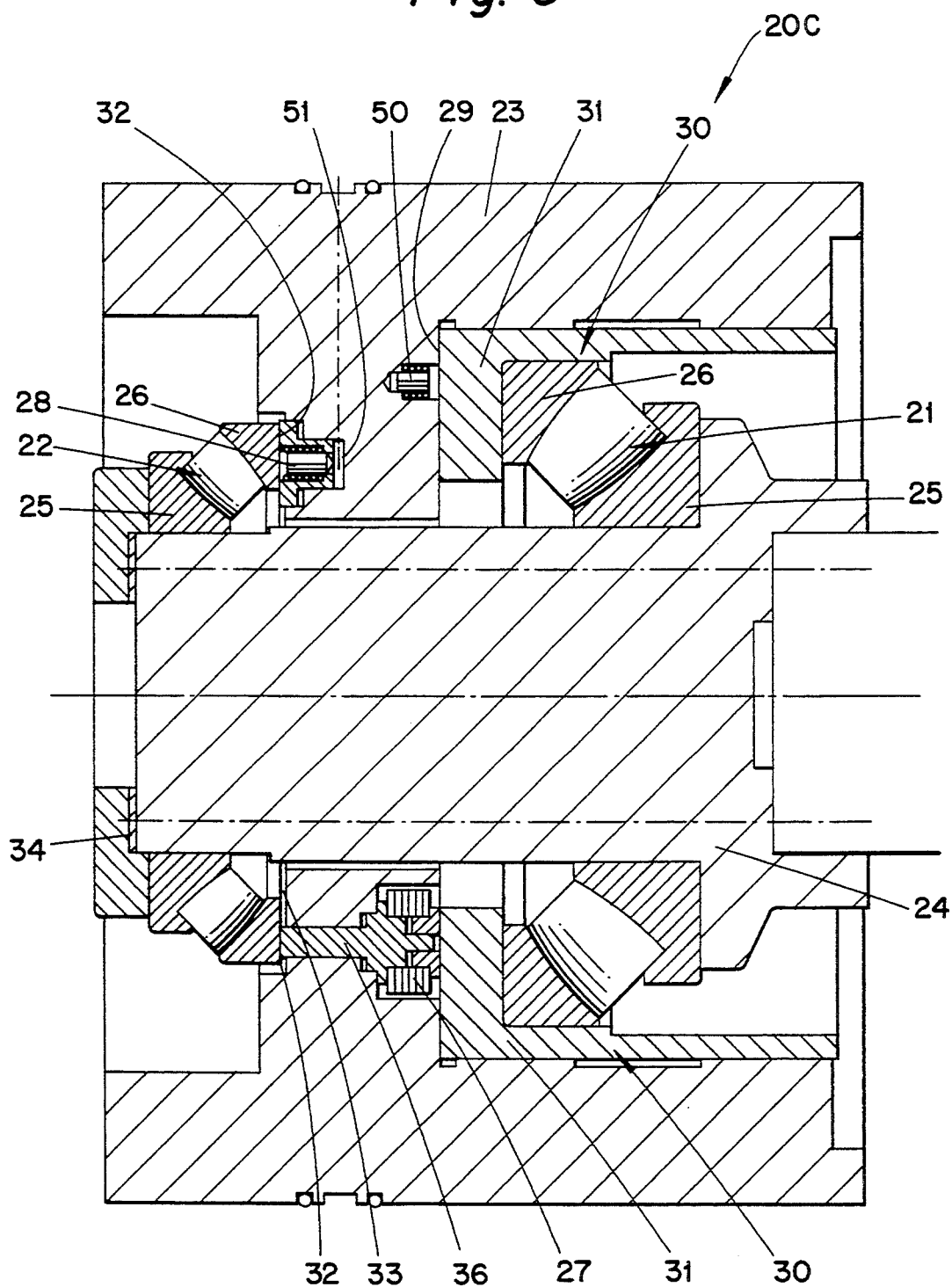
FIG. 9 is a sectional front elevation of yet a further variation of the bearing assembly shown in FIG. 3.

FIG. 9 illustrates a further variation of the bearing assembly 20 shown in FIGS. 3 and 8, which has reduced susceptibility to rubbing by virtue of hydraulic pre-loading. Unless otherwise specified, the same reference numerals refer to the same components as are shown in FIGS. 3 and 8.

As indicated above the major feature distinguishing this bearing assembly 20C from that in FIG. 8 is the feature of hydraulic pre-loading. This pre-loading is facilitated by having hydraulically loaded piston sleeves 51 sealed with O-rings (not shown) associated with the springs 28. The piston sleeves are capable of expansion under hydraulic pressure to pre-load the springs 28. In an example embodiment with the basic components the same as those discussed above with respect to FIG. 3, the piston sleeve is subjected to a total constant hydraulic load of 100 kN, when the external axial load is below, say 125 kN, which is half the magnitude of the maximum working load.

As a load of 100 kN is slightly higher than the spring loading of springs 27, the hydraulic load acts to bring about an axial clearance of 0.075 mm between the outer race 26 of the rear bearing 22 and component 36 of the spring 27. This clearance is estimated with aid of FIGS. 6 and 7 and would permit a radial run-out of 0.17 mm of shaft 24. By adjustment of the thickness of the washers 34, an axial clearance greater than 0.075 mm could also be obtained.

In use, the outer race 26 will tilt on the hydraulically loaded piston sleeves 51 when the hydraulic pressure is applied, and on the springs 28 during operation when no hydraulic pressure is applied. The bearing assembly 20C in FIG. 9 is very stiff and axial movement of the shaft 24 when changing from idle running to a maximum working load of 250 kN will only be 0.03 mm.

Briefly, the hydraulic equipment includes a sensor sensing the oil pressure in the hydraulic cylinder, which provides the working load, and an oil feed which supplies oil under pressure to the piston sleeves 51. The piston sleeves are supplied with oil through radially drilled ducts, which are in fluid communication with each other via an external groove formed in the housing 23. The feature of placing the ducts in fluid communication with each other ensures that there is no hydraulic resistance to tilting of the outer race 26. To obtain a hydraulic load of 100 kN, an oil supply having an oil pressure of 6 MPa is required. The sensor, mentioned above, can be adjusted so that the constant oil pressure of 6 MPa is applied, when the working load is below 125 kN. Normal working loads are 180–250 kN.

The springs 50 in FIG. 9 are not required where the assembly 20C provides for hydraulic pre-loading.

It is an advantage of a bearing assembly in accordance with the invention that there is no wear of the axial outer abutment of the outer race of the rear bearing due to rubbing against the complementary abutment of the housing.

It is a further advantage of a bearing assembly in accordance with this invention that the maximum axial spring loading on the radially locating front bearing acts in a direction opposite to the thrust of the shaft and consequently the spring loading has no negative influence on bearing life.

It is a further advantage of a bearing assembly in accordance with this invention that the individual bearings are free of clearance under all working conditions and also that there is no risk of appreciable increase of bearing load even if temperature differences occur within the assembly.

It is a further advantage of a bearing assembly in accordance with this invention that the design thereof is relatively simple and certainly no more complicated than other prior art designs.

It is a further advantage of a bearing assembly in accordance with the invention that the additional cost of manufacturing occasioned by incorporating features of the invention is minimal.

It is to be understood that various alterations, modifications, and/or additions may be introduced into the construction and arrangements of parts previously described without departing from the spirit or scope of the invention as defined in the appended claims.

What is claimed is:

1. A thrust bearing assembly comprising a bearing housing, a front spherical thrust roller bearing and a rear spherical thrust roller bearing, each of said front and rear bearings including inner and outer race rings, said housing forming seats for said outer race rings of said front and rear bearings, said front and rear bearings mounted in said housing in opposite directions, and supporting a shaft, first and second spring devices being provided to exert a pre-load upon said front and rear bearings, wherein a bearing pre-load exerted by said first spring device acts on the front bearing in a direction opposed to a direction of a working load applied to said front bearing, said first spring device including means for removing the spring force from said front bearing when exposed to a working bearing load exceeding the load exerted by said first spring device, said first and second spring devices under working load and idle conditions being arranged to form a clearance between said seat for said outer race of said rear bearing and said outer race of said rear bearing to allow tilting of said outer race of said rear bearing for compensating for radial oscillations and avoiding rubbing movement between said housing and said outer race ring of said rear bearing.

2. A thrust bearing assembly according to claim 1, wherein said first spring device is arranged to impart, in conditions of idle running, a preload upon both bearings, whereby simultaneously said second spring device provides said clearance for said rear bearing, said means for removing said spring force being arranged to remove said pre-load imparted by said first spring member to both bearings when the front bearing under normal working conditions is subjected to a working load, the second spring being arranged to provide a weaker pre-load to said rear bearing under such normal working conditions, thereby creating a clearance between said outer race ring of said rear bearing and its bearing seat.

3. A thrust bearing assembly according to claim 2, wherein said means arranged to remove said preload includes a spring component comprised of a two-piece cylinder-and-piston assembly urged apart by said first spring device, said cylinder-and-piston assembly being received in an opening in a wall portion of the housing provided between said front bearing and said rear bearing and arranged, during idle running conditions, to press against an abutment surface on the outer race of the front bearing and against an abutment surface on the outer face of the rear bearing, said cylinder-and-piston assembly being moveable under axial load acting on the shaft to a position wherein said outer race rings directly contact fixed abutments provided in the housing, both outer race rings in this position being uninfluenced by said pre-load imposed by said first spring device, when the external thrust load is larger than the thrust load from said first spring device.

4. A thrust bearing assembly according to claim 1, wherein the rear bearing is mounted on the shaft with an axial clearance formed between an axial abutment surface of said outer race of said rear bearing and a proximate part of said housing, such axial clearance accommodating free tilting of said outer race of said rear bearing.

5. A thrust bearing assembly according to claim 4, wherein said axial clearance is provided by distance washers.

6. A thrust bearing assembly according to claim 1, wherein the outer race of the front bearing is positioned in a sleeve having a radially extending flange forming an inner abutment for said outer race of said front bearing and defining the outer abutment of said front bearing, said first arranged spring device being arranged to urge the sleeve towards the outer race of said front bearing, said sleeve being provided to prevent the outer race of the front bearing from tilting in the housing.

7. A thrust bearing assembly according to claim 6, wherein additional spring devices are positioned between said sleeve and an adjacent portion of the housing for eliminating radial clearance between the sleeve and the housing in order to prevent the front bearing from tilting in the housing.

8. A thrust bearing assembly according to claim 1 including hydraulically operated piston-sleeves provided in association with said spring devices.

9. A shaft bearing assembly comprising a front spherical roller thrust bearing having an inner race seated against an outer abutment of a shaft to be supported, an outer race and a plurality of rolling bodies disposed between said inner and outer races, the outer race being arranged in an axially displaceable manner inside a bearing housing and having an axial outer abutment, a number of first springs being provided between said outer abutment and a stationary abutment in the housing for pressing against said outer race in order to provide said front bearing with sufficient pre-load under all load conditions, and wherein under an external axial load exceeding the total spring load of said first springs said first springs being compressed so that said outer abutment bears directly against the housing abutment to eliminate any spring load on the bearing life, a rear spherical thrust roller bearing having an inner race mounted on the shaft in a reverse direction compared to the inner race of said front bearing and axially spaced therefrom, and an outer race provided with radial and axial clearance with respect to a seat provided in the housing, for allowing free tilting of the outer race of the rear bearing, said rear bearing outer race arranged to be acted upon by said first springs during steady state running, during operational loading in the first mentioned axial direction of the shaft the outer race of the rear bearing being completely relieved from the influence of said first springs due to bearing deflections and spring deflections occurring upon application of said operational load, a second set of springs being disposed between the housing and the outer race abutment of the rear bearing outer race to provide the rear bearing with sufficient pre-load when the load from the said first springs is removed by an external working load applied to the front bearing, said rear bearing being arranged to take up load acting in the opposite axial direction of the shaft.

* * * * *